(12) United States Patent
Lively

(10) Patent No.: US 6,527,015 B2
(45) Date of Patent: Mar. 4, 2003

(54) INSULATED PIPE

(76) Inventor: F. Glenn Lively, 2 Pastoral Pond Cir., The Woodlands, TX (US) 77380

( * ) Notice: Subject to any disclaimer, the term of this patent is extended or adjusted under 35 U.S.C. 154(b) by 0 days.

(21) Appl. No.: 10/020,494

(22) Filed: Dec. 7, 2001

(65) Prior Publication Data

US 2002/0066491 A1 Jun. 6, 2002

Related U.S. Application Data

(63) Continuation-in-part of application No. 09/605,112, filed on Jun. 28, 2000, now Pat. No. 6,397,895.
(60) Provisional application No. 60/304,175, filed on Jun. 23, 2000, and provisional application No. 60/142,340, filed on Jul. 2, 1999.

(51) Int. Cl.$^7$ .................................................. F16L 9/14
(52) U.S. Cl. ........................ 138/149; 138/155; 138/171; 138/146
(58) Field of Search ................................ 138/146, 149, 138/155, 171

(56) References Cited

U.S. PATENT DOCUMENTS

| | | | | | |
|---|---|---|---|---|---|
| 3,425,455 | A | * | 2/1969 | Kilpert et al. | 138/143 |
| 4,237,668 | A | * | 12/1980 | Mathusima et al. | 138/149 |
| 4,455,329 | A | * | 6/1984 | Snow | 427/234 |
| 4,789,567 | A | * | 12/1988 | Freeman et al. | 427/410 |
| 5,368,184 | A | * | 11/1994 | Fay et al. | 138/149 |
| 6,068,027 | A | * | 5/2000 | Miller | 138/149 |
| 6,079,452 | A | * | 6/2000 | Touzel et al. | 138/149 |
| 6,202,702 | B1 | * | 3/2001 | Ohira et al. | 138/149 |
| 6,397,895 | B1 | * | 6/2002 | Lively | 138/146 |

* cited by examiner

*Primary Examiner*—James Hook
(74) *Attorney, Agent, or Firm*—Douglas W. Miller

(57) ABSTRACT

Pipes or pipelines insulated on their surface or surfaces are described. The pipes or pipelines may be for submerged service, below the surface of water. The insulation chosen may be an epoxy substantially free of phenolics and one or more of glass or ceramics. The coating may be an abrasion resistant coating. Such pipes or pipelines are generally intended for the transport of fluids, which can include natural gas, natural gas liquids, crude oil, refined products, chemicals, combinations thereof, and the like.

7 Claims, 1 Drawing Sheet

INSULATED PIPE

Figure 1:
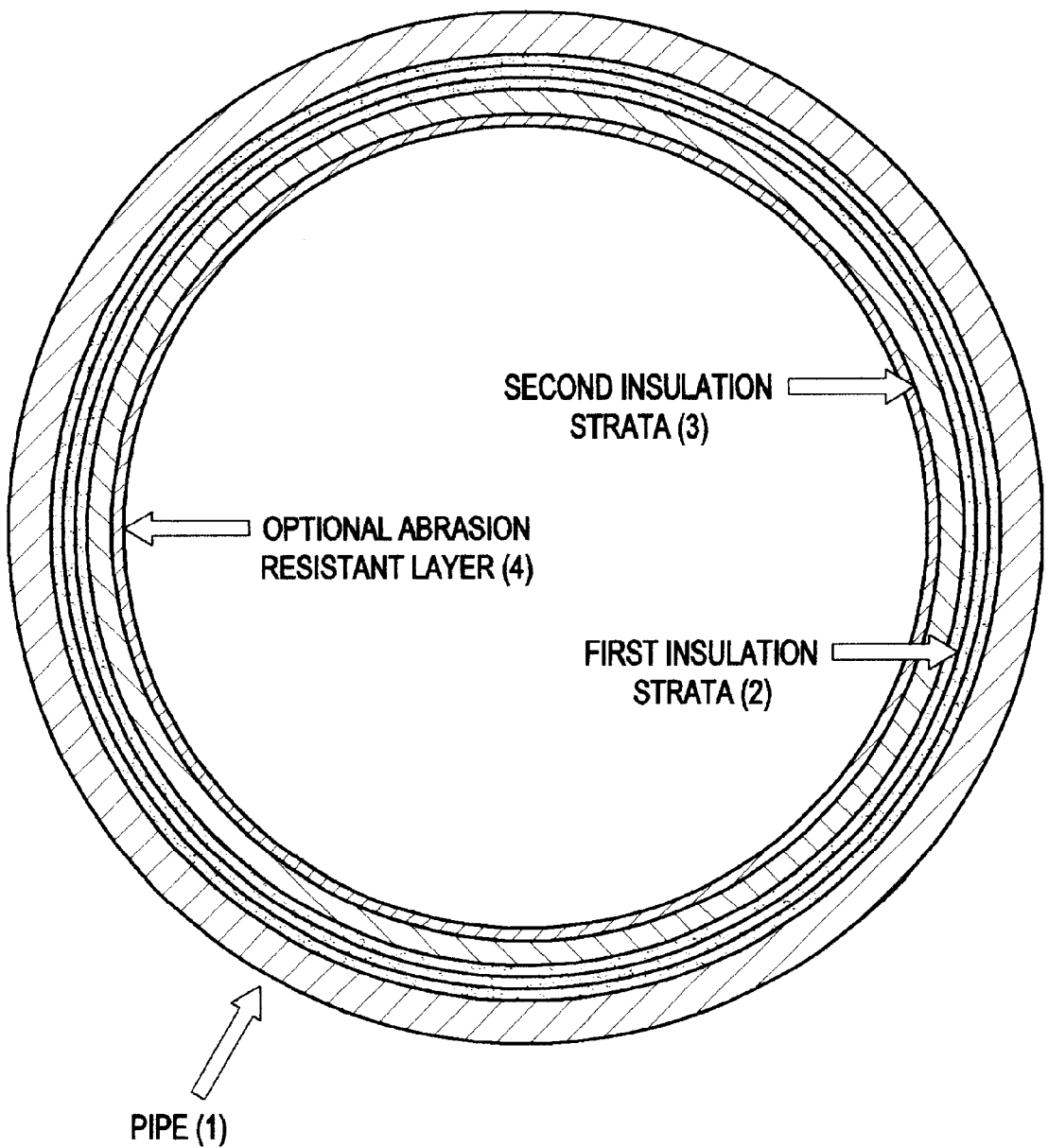

This application claims the benefit of U.S. Provisional Application No. 60/142,340, filed Jul. 2, 1999. Further, this application claims benefit of U.S. Non-Provisional application Ser. No. 09/439,302, filed Nov. 12, 1999 which was converted to U.S. Provisional Application No. 60/304,175, filed Jun. 23, 2000. Still further, this application claims the benefit of and is a Continuation-in-Part of regular U. W. application 09/605,112, filed Jun. 28, 2000 now U.S. Pat. No. 6,397,895. Such benefit is provided under 37 CFR §1.78 (a)(3) and 35 USC §120.

TECHNICAL FIELD

This invention relates generally to pipe coating. More specifically, embodiments of this invention relate to insulation strata including a layer or layers in each strata, on a pipe's circumference, where such layers may be abrasion resistant, corrosion resistant and provide thermal insulation to the pipe's contents. The insulation may be placed on a pipe's exterior circumference or surface, interior circumference or surface, or both. The pipe or a pipeline including the pipe, is intended for use in fluid transport, generally submerged.

DESCRIPTION

Introduction

Embodiments of my invention concern certain pipe insulation and pipe coatings.

In embodiments of my invention, the insulation strata may be applied to the interior or exterior circumference or surface of pipes or pipelines, or both the interior and exterior circumferences or surfaces. At least a first strata of insulation may be applied to the pipe surface preceded by an optional primer, a second strata applied to the first strata and optionally at least a first layer of an abrasion resistant coating may be applied to the second insulation strata.

In other embodiments of the present invention the first insulation strata may include a Ceramic-Cover™ 100, (manufactured) Therma-Cote Inc. of Atlanta, Ga., USA and may be described as a viscous solution of ceramic and acrylic latex. Or the first insulation strata may include Therma-Coat from Hempel Coatings, Conroe, Tex. The topcoat or abrasion resistant coating, EC-376F, may be manufactured by Industrial Environmental Coatings Corp of Pompano Beach, Fla.

A second strata may include one or more of syntactic plastic foam, such as polyethylene, polypropylene, polyurethane, and the like, and such syntactic foams may include discrete hollow or porous particles formed from another material. Such second strata may be formed in one or more layers.

Embodiments of this invention further include certain methods of applying the insulation strata and the optional coating. Also contemplated are pipes and pipelines coated, on the interior circumference and/or surface, exterior circumference and/or surface, or both, with an optional primer, with the insulation strata and/or the abrasion resistant coating. In an embodiment with both internal and external insulation, the interior and exterior may be the same or different in thickness, number of layers, materials used and the like. The insulation strata and optional abrasion resistant coatings have properties rendering them superior to, and unique from, previously available pipe insulation and coating. The pipe insulation and optional abrasion resistant coatings described herein are suited for use in producing certain classes of insulated, submerged or buried pipes or pipelines. Those skilled in the art will appreciate that numerous modifications to these embodiments can be made without departing from the scope of the invention. For example, although gas and crude oil pipes and pipelines, insulated on their interior or exterior, are discussed herein, the insulated pipelines may be made using combinations of other coatings and other surfaces to be coated. To the extent my description is specific, it is solely for the purpose of illustrating embodiments of my invention and should not be taken as limiting the present invention to these embodiments.

Definition of Terms and Tests

| | |
|---|---|
| Density: | ASTM D-793 |
| Compressive Strength: | ASTM D-1621 |
| R value, Thermal Resistance | ASTM C-177-85 |
| k, Thermal Conductance | ASTM C-158 |
| Adhesion to Steel | ASTM D-4541 |

Primer

A water and chemical resistant primer may optionally be applied directly to the surface of the pipe being insulated, between the pipe and a first layer of insulation. When a pipeline is installed offshore on the seafloor it may have high spots and low spots due to the undulation of the seafloor. In the low spots water may accumulate on the interior of the pipe. This water may come from hydrostatic testing of the pipeline or water entrained in the fluids carried by the pipeline. Such water may cause corrosion, called "6 o'clock" corrosion, for its location on the bottom of a pipeline as one would view a cross section. Should water penetrate the layers of insulation and the topcoat on the interior of the pipe, it could cause corrosion, resulting perhaps in a leak. Particularly troublesome is the presence of carbonic acid or hydrochloric acid in the water. Occasionally oil and gas will contain small amounts of corrosive gases such as carbon dioxide or hydrogen sulfide.

When either of these gases are dissolved in water, acid is created that may attack the surface of the pipe possibly causing failure of the pipe. The use of a primer between an insulation layer and the steel pipe surface may mitigate such a problem. Many types of primers are available and will be known to those of ordinary skill in the art, one type is a phenolic primer such as EP-10, which is manufactured by Morton (Reading, Pa.). This primer may be applied at a thickness that may average 1 mil and may be cured in an oven at 300° F. for one hour. Other primers may be used, some of these primers may not require oven curing, but may be air cured.

Insulation

The insulation of embodiments of my invention will include at least a first strata generally the closest of the strata to the pipe, of at least two layers and optionally a second strata of insulation, the second strata being at least one layer, wherein the first strata will be positioned between the pipe and the second strata.

First Strata

In embodiments of the present invention, the first insulation strata may include a Ceramic-Cover™ 100 (CC-100), manufactured Therma-Cote Inc. of Atlanta, Ga., USA, or the first insulation strata may include Therma-Coat coating manufactured by Hempel Coatings, referred to above. Combinations of any such materials are also contemplated. Polyurethane foam (PU), may have a heat or thermal conductance (k) from 0.65 to 0.1 BTU/sq. ft., hr., F.°. The conductance of the insulation of embodiments of my invention will be $\leq 0.4$ BTU/sq. ft. hr F.°, or $\leq 0.3$ BTU/sq. ft. hr F.°, or ≦0.08 BTU/sq. ft. hr F.°, or ≦0.07 BTU/sq. ft. hr F.°, or ≦0.06 BTU/sq. ft. hr F.°, or ≦0.05 BTU/sq. ft. hr F.°, or ≦0.04 BTU/sq. ft. hr F.°, or ≦0.03 BTU/sq. ft. hr F.°, or ≦0.02 BTU/sq. ft. hr F.°, or ≧0.001 BTU/sq. ft. hr F.°, or ≧0.003 BTU/sq. ft. hr F.°, or ≧0.005 BTU/sq. ft. hr F.°. The density of the first strata insulation, excluding the fibrous or non-woven material discussed herein, as determined by ASTM D-792, may be ≧0.1 g/cm$^3$, or ≧0.2 g/cm$^3$, or ≧0.3 g/cm$^3$, or ≧0.35 g/cm$^3$, or ≦0.95 g/cm$^3$, or ≦0.75 g/cm$^3$, or ≦0.65 g/cm$^3$-, or ≦0.55 g/cm$^3$. The density of common rigid urethane foams is in the range of 0.012–0.025 g/cm$^3$. The compressive strength of the first strata insulation of embodiments of my invention, may be ≧100 psi, or ≧200 psi, or ≧400 psi, or ≧800 psi, or ≧1500 psi, or ≧2,000 psi, or ≧2500 psi or ≧3000 psi, or ≧3500 psi, or ≧4000 psi. The compressive strength of rigid urethane foams is in the range of 15–60 psi (10% deflection).

The first insulation strata may be characterized by its R value (Thermal resistance °F. hr ft$^2$/BTU) per applied inch. Other types of insulation typically have Thermal resistance as follows: cork board typically has an insulation value of about 3.33 R value per inch; rock cork about 3.9 R value per inch; expanded polystyrene about 3.0 R value per inch; and polyurethane foam 5–9 R value per inch. Such other types of insulation may be utilized in the second insulation strata. The first insulation strata of embodiments of the present invention may be ≧5 R value per inch, or ≧10 R value per inch, or ≧12, or ≧14 R value per inch, or ≧25 R value per inch, or ≧35 R value per inch, or ≧40 R value per inch, or ≧45 R value per inch, or ≧50 R value per inch, or ≧60 R value per inch or ≦400 R value per inch, or ≦300 R value per inch, or ≦200 R value per inch, or ≦150 R value per inch, or ≦125 R value per inch. Other insulation materials for the first strata are contemplated as long as it provides the insulation values stated herein.

Adhesion to steel, of the first strata insulation of embodiments of my invention, as determined by ASTM D-4541, may be ≧1000 psi, or ≧1500 psi, or ≧1700 psi, or ≧1800 psi, or ≧2000 psi, or ≧2200 psi, or ≧2300 psi.

The CC-100 insulation is described by its manufacturer (Therma-Cote) as a proprietary viscous solution of ceramic and acrylic latex. The insulation is also described as an 84% solid latex, high density material. The ceramic portion of the CC-100 insulation is described as an asymmetrical particle, of amorphous shape. Such a shape is substantially non-spheroidal. However, I also contemplate spheres or spheroidal shapes for the ceramic insulation. Further contemplated as part of the first strata insulation are a layer or layers of fabric or fibers, woven or non-woven of polymeric or inorganic materials. Such materials may be made from carbon fibers, silica fibers, glass fibers, polyethylene fibers or fabrics, polypropylene fibers or fabrics, polyphenylene sulfide fibers or fabrics, glass wool, mineral wool, cork, rock cork, polystyrene. The first insulation strata may also contain glass microspheres. The ceramic or glass portion of the CC-100 insulation will be ≧5% (volume), or ≧7%, or ≧9%, or ≦25%, or ≦20%, or ≦15%. These volumetric measurements are after substantially all of the volatiles and/or evaporative ingredients have been removed.

The Therma-Coat insulation is characterized by its manufacturer (Hempel) as a high solids epoxy, 84+% solids (volume) and/or 86+% solids by weight. The Therma-Coat insulation is substantially free of phenolics. By substantially free of phenolics, I intend that ≦5 weight percent, or ≦3 weight percent, or ≦1 weight percent, or 0 percent of the high solids epoxy will be phenolics. This substantial freedom of phenolics relates to the first insulation strata of embodiments of my invention and not to the optional primer or optional top coat, which may include phenolics. The Therma-Coat (Hempel) insulation may use microspheres of glass, ceramic spheres, amorphous ceramic or glass shapes, spheroidal ceramic or glass shapes, non-spheroidal ceramic or glass shapes, or combinations thereof. The ratio of glass to ceramics in the organic matrix, after volatilization and/or evaporation may be 10:90 to 90:10 or 20:80 to 80:20, or 30:70 to 70:30, or 40:60 to 60:40. The ratio of both glass and ceramic to the organic components, after volatilization and/or evaporation may be 10:90 to 90:10, or 20:80 to 80:20, or 30:70 to 70:30, or 40:60 to 60:40. The insulation may be applied by any conventional method, such as rolling, brushing, troweling, extruding or spraying. In a typical installation, the insulation, first and second strata, will be applied to the interior surfaces or circumferences of the pipe, the exterior surface or circumference of the pipe, or both. Optionally, a primer will be placed directly on the pipe surface or surfaces, followed by the first insulation strata described herein.

While the manufacturers of these products state that no specific surface preparation may be necessary, the surface may be prepared, by methods known to those of ordinary skill in the art, to reduce or eliminate any oils, dirt, or other potential contaminants on a pipe's surface or surfaces, that might affect the adhesion or insulation performance of the applied combination of insulation and abrasion resistant coating.

In application of this first insulation strata to a pipe, after optional surface preparation, and after an optional primer layer or layers applied and the insulation applied, an optional abrasion resistant coating be applied after the insulation layer or layers have cured.

The surface roughness or smoothness of steel pipes is generally 0.0018 inches, while the insulation described herein is generally ≦0.0006 inches, or ≦0.0004 inches, or ≦0.0002 inches, or ≦0.0001 inches, or ≦0.00009 inches. The insulation will also provide corrosion protection to the surface or surfaces to which it is applied.

The surface temperature of the pipe upon which the insulation may be ambient or up to 150° F. Application in the range of from 32° F. to 460° F. is also contemplated.

Applications of the first insulation strata may be at a total thickness of ≧2 mils, or ≧5 mils, or ≧10 mils, or ≧20 mils, or ≧25 mils, or ≦100 mils, or ≦90 mils or ≦85 mils. Or in other embodiments of my invention, the first insulation strata can be applied in one coat at ≧2 mils or ≧5 mils, or ≧10 mils or ≧15 mils, or ≧25 mils, or ≦60 mils, or ≧50 mils or ≦40 mils thickness, or in several coats or layers, 2, 3, 4, 5, 6, 7, 8, 9, 10 or more layers, to these total thicknesses. The layers may be the same thickness or different.

Another insulating material that may be used for this first strata is a product known as Super-Therm®. Super-Therm® is a ceramic coating that is said to utilize three types ceramic particles to achieve results. Two of the ceramics are said to reflect heat and the third is said to prevent heat loss by conduction. It is said by the manufacturer to be made with two acrylics and one urethane. It completely cures in 7–10 days and may be applied within a temperature range of 40° F. up to 110° F. Hot Box Testing indicates that this material to be a thermal resistor that is said to be as effective as fiberglass with an equivalent rating of R19 (per inch). Thermal Conductivity of this material has been tested with a reported range from 0.00543 watts/cm °K up to 0.00640 watts/cm °K. Insulation coefficients are reported by the manufacturer to be 0.13 BTU/ft2 hr F.° or in metric terms—0.019 metric watts/meter kelvin°.

Another insulation product that may also be used where the insulation value is provided by hollow glass (micro) spheres. This product is called Biotherm® 453 and is manufactured by TFT of Houston, Tex. This material is said by its manufacturer to be a primarily epoxy resin with proprietary polyamines. It is further said to have low volatile organic compounds (VOC's) and is normally trowel applied but may be spray applied.

The use of the insulation layer or layers, without the use of a topcoat, is also contemplated, such insulation-only applications may include the optional primer.

The first strata can include the above embodiments, and may further include other materials. Such other materials (referred to below as (G)) include, but are not limited to fiberglass matting, fiberglass fabric or roving, rock wool, rock cork, mineral wool, silica fiber tape, carbon fiber tape, fumed silica, polyphenylene sulfide, polyphenylene oxide fibers and fabrics made from these materials as well as non-woven fabrics or matting and the like. Such materials may be alternated with the material or materials described above, or can be used in a non-symmetric manner with the application of the matrix and contained particles (referred to below as H). By non-symmetric I intend 1, 2, 3, 4, 5 or more layers of matrix and particles may be applied, followed by one or more layers of other materials such as fiberglass matting, fabric, strands or roving, rock wool, mineral wool, silica fiber tape, carbon fiber tape, fumed silica, polyphenylene sulfide tape, fabric or non-woven, and the like, and generally followed by another 1, 2, 3, 4, 5 or more layers of matrix and particles. Symmetric application is intended to mean alternating layers of the above materials such as H, G, H, G, or H, H, G, G, H, H, G, G, H, H. Such fiber or fabric may be wetted prior to application either with an epoxy or polyester resin or system or the combination with glass and/or ceramic shapes.

Second Strata

The second strata of insulation of embodiments of my invention may include syntactic foams as discussed above, and may alternatively include one or more layers of the insulation material or materials of the first strata coupled with the syntactic foam or other second strata insulation. Or the second strata may include the material combinations described immediately above. In another embodiment, a second pipe or conduit spaced outside, or containing the first pipe or conduit, the second pipe may be encompass the first strata and a second insulation strata material selected from one or more of syntactic foams as discussed herein, liquids, vacuum, gases (such as nitrogen or other generally inert gases or air and the like) or combinations thereof, all of which are intended to provide insulation to the pipe or conduit.

The second strata may include one or more of syntactic plastic foam, such as polyethylene, polypropylene, polyurethane, polyvinyl chloride, polystyrene, and the like, and such syntactic foams may include discrete hollow or porous particles formed from another material, either organic or inorganic. Such second strata may be formed in one or more layers.

The second strata may also include one or more of silica, glass ceramic or carbon fiber, tape or fabric (woven or non-woven), silica, glass ceramic or carbon fiber epoxy composites, silica, glass ceramic or carbon fiber and other polymers.

The thickness of the second strata may be >0.1", or >0.25", or >0.5", or >1" or <10", or <8", or <6". The number of layers may be from 1 to 10 or more and all numbers in between.

Abrasion Resistant Coating

Optionally, one or more layers of a topcoat, such as EC-376F, manufactured by Industrial Environmental Coatings Corp of Pompano Beach, Fla., may be used as the topcoat or abrasion resistant coating, generally applied to the outermost insulation strata.

EC-376F is described by the manufacturer to be a specially formulated high performance, 100% solids, flexibilized epoxy phenolic that is said to demonstrate excellent adhesion, resistance to thermal and mechanical shock and excellent chemical and physical resistance in a wide range of crude and refined petroleum products. It is further described as a thick-film epoxy material that exhibits excellent performance characteristics when evaluated against other thick-film epoxy coatings in the following tests:

Standard Atlas Cell Test (Modified NACE TMO 174-91)
Pressurized Atlas Cell Test (Modified NACE TMO 174-91)
Autoclave Test (NACE TM0 1 85-88)
Impact Test (ASTM G 14-88)
Abrasion Resistance (ASTM D 4060-90)
Cathodic Disbondment (ASTM G95)
Adhesion Pull-Off Strength (ASTM D4541-89)
Flexibility (Modified CSA Z245, 20-M92)
Hardness (Shore D)
Electrochemical Impedance Spectroscopy (E.I.S.)

Epoxy coatings generally may not be suited for high temperatures (above 225° F.). Epoxy coatings may be generally low in adhesion (900–1000 psi to the substrate) where EC-376 has tested above 1800 psi. EC-376 exhibits improved permeability values over typical epoxy coatings. The chemical resistance of epoxy is generally good but depends on the type epoxy used.

Additionally or alternatively, the optional abrasion resistant coating may be Ceram-Kote™ 54, manufactured by Freecom, Inc. Big Spring, Tex., USA, which is described as an epoxy ceramic. The coating is described as an epoxy ceramic. The product may be considered to be described in U.S. Pat. Nos. 4,968,538 and 4,789,567, both filly incorporated by reference herein for purposes of US patent practice.

The optional abrasion resistant coating can be applied to the insulation in 1, or 2, or 3 or 4 or more layers at a thickness of $\geq 1$ mils, or $\geq 5$ mils, or $\geq 10$ mils, or $\leq 40$ mils, or $\leq 30$ mils, or $\leq 25$ mils, or $\leq 20$ mils, or $\leq 15$ mils. The number of coats or layers of this abrasion resistant coating material, as for the above insulation, may be more than one, and up to 10 or more.

Other optional top coats are contemplated. As long as the coating selected has substantially complete adhesion to the outermost insulation strata, provides a desired protection of the insulation layer or layers, if necessary, and does not substantially impede the flow of product and may enhance the flow, they will be among the coatings contemplated.

Pipes and Pipelines

Pipes and pipelines are contemplated as substrates to be coated by the combination of insulation strata and optional abrasion resistant coating. While generally including pipes of $\geq 2$ inches (5 cm), or $\leq 48$ inches (232.2 cm), or $\leq 40$ inches, or $\leq 30$ inches (75 cm) in inside diameter (ID), other sizes are contemplated as well. The pipe will generally form some portion of a fluid delivery apparatus, such as a pipeline, including pumps, manifolds, heaters production risers, drilling risers, Ts, elbows, instrumentation, down hole safety valves, packers, tubing hangers, injection mandrels, temperature measurement gauges, and the like. Pipe may be of any length, and when combined through conventional means (welding, coupling), may form a pipeline, again of any length. The pipelines contemplated are used to transport fluids such as natural gas, crude oil, refined petroleum products (such as gasoline, jet fuel, aviation gas, kerosene, heating oil, or bunker oil) fluid chemicals, slurries, brine, and the like. While an environment for the coated and insulated pipe or pipeline may be underwater, other uses are not precluded, such as underground, or above ground in any application where maintanence of some or all of a temperature difference ($\Delta T$) between product inside the pipe and the exterior environment is sought. The pipe may be steel or any type of ferrous or non-ferrous metal, plastic fiber composites (such as "fiberglass" or carbon fiber composites).

In a further embodiment, at least a portion of the pipeline is submerged in water.

The water may be fresh, brackish or salt water. The depth may be 0.1 meter to 2 kilometers or even greater depths as technology is available, are contemplated.

The combination of insulation and optional abrasion resistant coatings as described above may be of any total thickness, controlled by the application process and the desired control of product temperature and the environment that surrounds the pipe or pipeline. The optional abrasion resistant coating is described above, and each layer may be applied in one or more coating passes or application layers. The amount of protection from the outside elements desired may be a consideration of the amount of insulation and or coating applied, the temperature and chemical makeup of the fluids to be transported, as well as the distance to be transported. For instance product, e.g. crude oil, at 120° F. as received from the wellhead, knowing the desired exit temperature traveling through water at 50° F., for two miles, will require certain levels of insulation, and the insulation may require a certain level of the optional abrasion resistant coating, both may be determined by those of ordinary skill in the art applying principles of fluid transport and thermodynamics. Also to be considered is the nature of the transported fluid, for instance, if the product has a substantial portion of constituents that would crystallize (or form hydrates) or in another way come out of the fluid at temperatures below the temperatures coming out of the wellhead, then the product must be desirably kept above the temperature at which the crystallization would occur. Even if the product is substantially devoid of such constituents, but would rise in viscosity at temperatures approaching that of the (lower) ambient environment, it is advantageous to reduce or eliminate the viscosity rise. There may be other reasons or combinations of reasons to insulate pipes and pipelines, such uses are also contemplated.

Those of ordinary skill in the art will appreciate that an effective amount of each of the insulation strata and the optional abrasion resistant coating layer or layers will be applied to a given pipe for specific service. Again, as above, the temperature difference between the environment and the fluid product (e.g. water temperature, and crude oil temperature) as well as the temperature at which the fluid product is desired to be maintained or delivered, will be determinative of the amount of insulation, thickness and/or number of insulation layers, and optional abrasion resistant coating used. By an effective amount I intend that this include not only total thickness, but also an effective number of layers making up the total thickness. The layers may be equal or unequal in their thickness.

Fluids

While natural gas, natural gas liquids, and crude oil are disclosed, any fluid, e.g. gas, liquid, slurry, are contemplated.

Other Pipeline Insulation

While the insulation described herein will generally suffice for relatively long pipe runs and in water or other media, such as earth (burial) and air, that can be cold, additional insulation schemes may be used in addition to the insulation strata the pipe disclosed herein.

For instance, burial in a trench and/or burial or partial burial with fine-grained bulk material such as sand, and/or coarse-grained material such as gravel as an addition to embodiments of my invention is also contemplated. Among such techniques are those disclosed in GB 2 221 873A (Wesminster Seaway Ans).

Other techniques such as pipe in a pipe, while generally being less desirable as a sole insulation system than the insulation system discussed herein, may be used in addition to or in combination with the disclosed insulation.

Some insulation value may result from the optional abrasion resistant coating, the majority of the insulation value is expected to be derived from the insulation of embodiments of my invention.

While I contemplate pipes or piplines with the insulation proximate the circumference of the pipe or pipeline (and optionally a primer between the pipe surface and a first layer of insulation), and the optional abrasion resistant coating proximate the of the insulation layer or layers, other schemes are also contemplated. As possible combinations described below a)=insulation layer in a first strata, b)=abrasion resistant coating, c) insulation layer in a second strata, d) fiber or fabric Pi)=pipe's interior circumference, Po)=pipe's exterior circumference, and $\eta$=a number 1 or greater.

Pi, a, b, or Pi, b, a, or Pi, a, b, a, or Pi, a, a, . . . $a^n$, b, b, . . . $b^n$ Or, Pi, a, a, . . . $a^n$, b, or Pi, a, b, a, b or b, a, Po, Pi, a, b or a, Po, Pi, a, b, or a, a, . . . $a^n$, Po, Pi, a, a, . . . $a^n$, b, or b, Po, Pi, a, b, or b, . . . $b^n$, a, . . . $a^n$, Po, Pi, a, . . . $a^n$, b, . . . $b^n$ or Po, Pi, $b^n$, $a^n$, or b, b, a, a, Po, Pi, or b, a, a, Po, Pi or $b^n$, $a^n$, Po, Pi, $a^n$, $b^n$, or b, Po, Pi, or $b^n$, Po, Pi, or a, Po, Pi, a or a, Po, Pi, $a^n$, or $a^n$, Po, Pi, a, or $a^n$, Po, Pi, $a^n$., Po, Pi, a, or Po, Pi, $a^n$. $c^n$, $a^n$, Po, Pi, or c, $a^n$, Po, Pi, or $c^n$, $a^n$, Po, Pi, $a^n$, or $c^n$, $a^n$, Po, Pi, $a^n$, $c^n$, or Po, Pi, $a^n$, $c^n$, or Pi, a, d, $c^n$ or Pi $a^n$, d, $c^n$, or Pi, $a^n$, $d^n$, c or Pi, $a^n$, d, c or Pi, a, d, c or Pi, $a^n$, $d^n$, c or Pi, $(a+d)^n$, c or c, d, a, Po or c, $d^n$, a, Po or c, $d^n$, $a^n$, Po, or $c^n$, $d^n$, $a^n$, Po or c, $(d+a)^n$, Po, or $c^n$, $(d+a)^n$, Po, or c, $(d+a)^n$, Po, or $c^n$, $(d+a)^n$, Po, or c, $(d+a)^n$, Po, Pi, $a^n$, or c, $(d+a)^n$, or c, $(d+a)^n$, c, b.

Other methods of insulating pipe or pipelines known to those of ordinary skill in the art may be used in conjunction with the insulation strata of the pipe as disclosed herein. Such other methods should be additive to the techniques and materials (insulation) disclosed herein. At a minimum such techniques should not detract from the insulation provided by the insulation described herein.

Exterior Pipe Coatings

Corrosion protection of an exterior or exterior surface of a pipe by any conventional means known to those of ordinary skill in the art, in addition to my disclosed insulation and optional abrasion resistant coating on the interior and optionally on the exterior of the pipe, is also contemplated.

Such exterior corrosion protection may include, but is not limited to, adhesive and tape (e.g. vinyl or polyethylene) wrapping, epoxy powder coating, other powder coating, extruded plastic (such as polyurethane, polyolefins, vinyl and the like), extruded elastomers (ethylene propylene rubber, butyl rubber, nitrile rubber, polychloroprene rubber and the like), liquid applied epoxy both by itself and in conjunction with woven or non-woven tapes or fabrics or polymeric organics or inorganics, and combinations of these techniques.

Additionally, the application of the insulation layer or layers, preceded by an optional primer, and optionally covered by an abrasion resistant coating, to the exterior of the pipe, in addition to the application of a similar system on the interior surface of the pipe is also contemplated.

Also contemplated are cement or cementitious compositions used on the exterior of pipes or pipelines in conjunction with embodiments of my invention disclosed herein.

Pipe Joining and Joint Protection

As pipe is joined by welding, coatings formed on the interior surface of the pipe prior to welding, may be degraded by the high temperature of welding. To address such a problem, various measures have been proposed. Among these various measures are U.S. Pat. No. 5,547,228 and a Continuation-in-Part of the '228 document, U.S. Pat. No. 5,566,984, both fully incorporated by reference herein for purposes of U.S. patent prosecution, which suggest a solution. These documents suggest several constructions that are said to protect both the pipe being welded and its coating. The cylindrical corrosion barrier for pipe connections may be a non metallic material such as polytetrafluoro ethylene (PTFE) which may also have fibers in the polymer matrix (such as glass fibers). Use of such welding protection devices and methods, in conjunction with embodiments of my invention, are also contemplated. We further contemplate that such a cylindrical corrosion barrier may be a length of pipe, similar in size and configuration (although small enough to fit in the pipes to be welded) to the PTFE barrier, and such small length of pipe may be coated similarly to the pipe itself by methods and with materials disclosed herein. That is, on its interior, an optional primer may be proximate the interior surface of the barrier covered with at least one layer of the insulation and optionally at least one layer of an abrasion resistant coating. Such a system will provide insulation at the weld lines where the pipe is joined.

Additional insulating layers of other materials such as polyurethane, polyvinyl chloride (PVC), polystyrene and the like, either foamed or non-foamed are also contemplated.

Other corrosion resistant coating or layers are also contemplated including, but not limited to asphaltics, pressure sensitive adhesives, PVC, polyethylene, impregnated paper, epoxy powder and liquid applied, with or without an organic or inorganic tape or fiber, and the like.

PROSPECTIVE EXAMPLES

Prospective Example 1

A 6 inch (15.24 cm) ID steel pipe is sand blasted with garnet to clean mill scale, dirt, grease and other contaminants from the steel. The grit so blasted on the interior surface creates a 1–4 mil anchor profile to aid in adhesion of the primer and/or insulation layer to the interior steel surface of the pipe. A primer such as EP-10, manufactured by Morton, (Reading, Pa.), is applied at a thickness from 0.5 mil to 1 mil and is cured by heat for 30 minutes to one hour at 300° F. The primer is applied directly to grit blasted steel surface prior to the application of the first insulation layer. The primer is spray applied using an automated coating lance that reaches from the entry end of the pipe to the far end. When the retraction of the lance begins, the primer is applied by pressure through a spray tip on the end of the lance at 360 degrees to cover the interior surface at the thickness stated above. The pipe is heated to a steel temperature of 150° F. A coating lance is inserted through the pipe and 40 mils of ceramic insulation Ceram Cover® 100 is applied using an airless spray tip that spins creating a 360° spray pattern. The density of the ceramic insulation, as determined by ASTM D-792 is 0.41 g/cm$^3$.

The pipe is then moved to a cure oven with a temperature of 160° F.–175° F., and remains in the oven at the temperature for 10 minutes. Then a coat of Enviroline® EC-376 (Enviromental Coatings Corp., Pompano Beach Fla.) is applied to an additional (in addition to the thicknesses of ceramic insulation) thickness of 10 to 15 mils. After the abrasion resistant epoxy coating or top coating is applied and allowed to cure for 1 hour, a wet sponge holiday detection lance is inserted into the pipe which detects holidays or pinholes. If a pinhole is detected, the coating lance is re-inserted to that portion or portions where the pinhole is detected and additional abrasion resistant epoxy coating is applied.

Additional prospective examples are made to demostrate the effectiveness of the application of multi-layers of the insulation. The examples represented in Tables II and IV are two different applications of insulation, and Table V represents bare steel with no coating, primer, or insulation.

This comparison is between a steel pipe insulated with 40 mils of the ceramic insulation in one layer (Table IV), and a similar steel pipe insulated with 40 mils of the ceramic insulation but with four ten mil layers (Table II). The assumptions, conditions and results are found in Tables I–IV.

All examples have an initial oil temperature of 140° F. and are operating in an environment of 36° F. water. The pipe is 6 inch. With one layer of insulation at 40 mils thickness at a flow rate of 10,000 barrels per day (bbl/day), the oil comes to 100° F. in a distance of 4.56 miles. In the example with four ten mil layers (total again 40 mils) of insulation the oil does not come to 100° F. until 17.11 miles, an increase over the single layer of 40 mils of over 275%. Also by contrast, the uninsulated (bare steel pipe, Table V) pipe comes to 100° F. at (1.5 miles)

In the tables which follow, the following abbreviations are used:

| | |
|---|---|
| Outside diameter | $d_o$ |
| Inside diameter | $d_i$ |
| cross sectional area | A |
| q | Heat flow from oil through (insulated) pipe, in BTU/hr. |
| P/L | Pipeline |
| T ° F. | Temperature, degrees Fahrenheit |
| Ti | Temperature inside of pipe/insulation |
| To | Temperature on outside of pipe |

Conclusion

The present invention has been described in considerable detail with reference to certain versions thereof, other versions are possible. For example, while steel pipes insulated on their circumference for transport of hydrocarbons have been exemplified, other uses are also contemplated. Therefore, the spirit and scope of the appended claims should not be limited to the description of the versions contained herein.

TABLE I

Oil Flow in Pipeline

| | | | |
|---|---|---|---|
| Pipeline: | 6" | Oil-steel film conductance, Uo-s | 5 Btu/ft2, hr, ° F. |
| $d_o$: | 6.625 inches | Water-steel conductance, Us-w | 4 Btu/ft2, hr, ° F. |
| $d_i$: | 5.761 inches | Steel thermal conductivity, ks | 312 Btu/ft2, hr, ° F./in |
| Length: | 8 miles | Oil specific heat; Ho | 0.5 Btu/Lb, ° F. |
| X-sect. Area: | 0.1810186 Ft2 | To, temperature of oil | |
| Outer Surf. Area, S: | 1.7344209 Ft2/Ft | Tw, temperature of water | |
| Fluid: | 40 API (6.87 Lb/gal) | Fluid volume | 0.181 Ft3 |
| Flowrate: | 10000 BBL/Day (38.99287 Ft3/min) | | 1.354 gallon |
| Fluid Velocity: | 215.40812 Ft/min | Weight w | |
| Flow Transit Time: | 3.2682148 Hours | | |
| Wt. Of 1-Ft. Section of Oil: | 9.3021101 Lb | | |
| Oil Temp. @ Entry: | 140° F. | | |
| Outside Water Temp: | 36° F. | | |
| Internally CC Coated: | 4 layers | CC-Oil film conductance, Ucc-o | 5 Btu/ft2, hr, ° F. |
| | 10 mils each | Steel-CC conductance, US-cc | 3.83 Btu/ft2, hr, ° F. |
| | | CC-CC layer conductance, Ucc | 0.667 Btu/ft2, hr, ° F. |
| Diameters | 5.741 d4 (1st layer) | CC thermal conductivity, kcc | 0.064 Btu/ft2, hr, ° F./in |
| | 5.721 d3 (2nd layer) | | |
| | 5.701 d2 (3rd layer) | | |
| | 5.681 d1 (4th layer) | | |
| X-sect. Area: | 0.1760261 Ft2 | | |
| Fluid Velocity w/CC: | 221.5176 Ft/min | | |
| Flow Transit Time: | 3.1780771 Hours | | |
| Wt. Of 1-Ft. Sect. Of Oil: | 9.045557 Lb | | |

Where $q = \dfrac{S \times (t_q - t_w)}{\dfrac{d_0}{d_1}\dfrac{1}{U_{cc-0}} + \dfrac{d_0}{2 \times k_{cc}}\log_e\dfrac{d_i}{d_1} + \dfrac{d_0}{U_{cc}} \times \left(\dfrac{1}{d_2} + \dfrac{1}{d_3} + \dfrac{1}{d_4}\right) + \dfrac{d_0}{2 \times k_s}\log_e\dfrac{d_0}{d_i} + \dfrac{d_0}{d_i}\dfrac{1}{U_{s-cc}} + \dfrac{1}{U_{w-s}}}$ the time required for oil temperature to drop 10° F. $\Delta T \times q = w \times Ho \times 10°$ F.

TABLE II

CC Coated Pipe Output Results
Oil Flow in Pipeline
4 Layers of CC
(Total thickness of 40 mils)
10 mils/layer
10,000 BOPD
q = 0.3225" (Ti-To)

| T ° F. | q @ T Btu/Hr | Avg. q for Temp Drop Btu/Hr | Time for Temp Drop Hr | Cum Time Hr | Distance In P/L Miles |
|---|---|---|---|---|---|
| 140 | 33.5412 | | | | |
| 130 | 30.3161 | 31.9286 | 1.4165 | 1.4165 | 3.5657 |
| 120 | 27.0909 | 28.7035 | 1.5757 | 2.9922 | 7.5321 |
| 110 | 23.8658 | 25.4784 | 1.7751 | 4.7674 | 12.0006 |
| 100 | 20.6407 | 22.2533 | 2.0324 | 6.7998 | 17.1167 |
| 90 | 17.4156 | 19.0282 | 2.3769 | 9.1767 | 23.0999 |
| 80 | 14.1905 | 15.8030 | 2.8620 | 12.0386 | 30.3042 |
| 70 | 10.9654 | 12.5779 | 3.5958 | 15.6344 | 39.3557 |
| 60 | 7.7403 | 9.3528 | 4.8357 | 20.4702 | 51.5284 |
| 50 | 4.5152 | 6.1277 | 7.3809 | 27.8510 | 70.1078 |
| 40 | 1.2900 | 2.9026 | 15.5818 | 43.4328 | 109.3311 |
| 38 | 0.6450 | 0.9675 | 9.3491 | 52.7819 | 132.8850 |
| 36 | 0.0000 | 0.3225 | 28.0473 | 80.8292 | 203.4669 |

TABLE III

Oil Flow in Pipeline

| | | | |
|---|---|---|---|
| Pipeline: | 6", schedule 80 | Oil-steel film conductance, Uo-s | 5 Btu/ft 2, hr, ° F. |
| OD: | 6.625 inches | Water-steel conductance, Us-w | 4 Btu/ft 2, hr, ° F. |
| ID: | 5.761 inches | Steel thermal conductivity, ks | 312 Btu/ft 2, hr, ° F./in |
| Length: | 8 miles | Oil specific heat; Ho | 0.5 Btu/Lb, ° F. |
| X-sect. Area: | 0.1810186 Ft 2 | | |
| Outer Surf. Area: | 1.7344209 Ft 2/Ft | | |
| Fluid: | 40 API (6.87 Lb/gal) | | |
| Flowrate: | 10000 BBL/Day (38.99287 Ft 3/min) | | |
| Fluid Velocity: | 215.40812 Ft/min | | |
| Flow Transit Time: | 3.2682148 Hours | | |
| Wt. Of 1-Ft. Section of Oil: | 9.3021101 Lb | | |
| Oil Temp. @ Entry: | 140° F. | | |
| Outside Water Temp: | 36° F. | | |
| Internally CC Coated: | 1 layers | CC-Oil film conductance, Ucc-o | 5 Btu/ft 2, hr, ° F. |
| | 40 mils each | Steel-CC conductance, US-cc | 3.83 Btu/ft 2, hr, ° F. |
| | | CC-CC layer conductance, Ucc | 0.667 Btu/ft 2, hr, ° F. |
| | 5.681 d1 (1st layer) | CC thermal conductivity, kcc | 0.064 Btu/ft 2, hr, ° F./in |

TABLE III-continued

Oil Flow in Pipeline

| | | | | |
|---|---|---|---|---|
| X-sect. Area: | 0.1760261 Ft 2 | | | |
| Fluid Velocity w/CC: | 221.5176 Ft/min | | | |
| Flow Transit Time: | 3.1780771 Hours | | | |
| Wt. Of 1-Ft. Sect. Of Oil: | 9.045557 Lb | | | |
| Externally CC Coated: | 1 layers 20 mils each 6.665 d3 (outer layer OD) | CC-Water film conductance, Ucc-w | 5 Btu/ft 2, hr, °F. (Estimated) | |
| Outer Surf. Area: | 1.74489029 Ft 2/Ft | | | |

TABLE IV

Internal CC Coated Pipe Output Results
Oil Flow in Pipeline
One Layer of CC
40 mils/layer
10,000 BOPD
q = 1.2082" (Ti-To)

| T °F. | q @ T Btu/Hr | Avg. q for Temp Drop Btu/Hr | Time for Temp Drop Hr | Cum Time Hr | Distance In P/L Miles |
|---|---|---|---|---|---|
| | 125.6535 | | | | |
| 130 | 113.5714 | 119.6124 | 0.3781 | 0.3781 | 0.9518 |
| 120 | 101.4893 | 107.5304 | 0.4206 | 0.7987 | 2.0106 |
| 110 | 89.4073 | 95.4483 | 0.4738 | 1.2726 | 3.2034 |
| 100 | 77.3252 | 83.3662 | 0.5425 | 1.8151 | 4.5690 |
| 90 | 65.2431 | 71.2842 | 0.6345 | 2.4496 | 6.1661 |
| 80 | 53.1611 | 59.2021 | 0.7640 | 3.2135 | 8.0892 |
| 70 | 41.0790 | 47.1201 | 0.9598 | 4.1734 | 10.5054 |
| 60 | 28.9970 | 35.0380 | 1.2908 | 5.4642 | 13.7547 |
| 50 | 16.9149 | 22.9559 | 1.9702 | 7.4344 | 18.7142 |
| 40 | 4.8328 | 10.8739 | 4.1593 | 11.5937 | 29.1842 |
| 38 | 2.4164 | 3.6246 | 2.4956 | 14.0893 | 35.4662 |
| 36 | 0.0000 | 1.2082 | 7.4868 | 21.5760 | 54.3122 |

TABLE V

Bare Steel Output Results
Oil Flow in Pipeline
10,000 BOPD

| T °F. | q @ T Btu/Hr | Avg. q for Temp Drop Btu/Hr | Time for Temp Drop Hr | Cum Time Hr | Distance in P/L Miles |
|---|---|---|---|---|---|
| 140 | 374.6373 | | | | |
| 130 | 338.6145 | 356.6259 | 0.1304 | 0.1304 | 0.3192 |
| 120 | 302.5917 | 320.6031 | 0.1451 | 0.2755 | 0.6744 |
| 110 | 266.5889 | 284.5803 | 0.1634 | 0.4389 | 1.0744 |
| 100 | 230.5460 | 248.5575 | 0.1871 | 0.6260 | 1.5325 |
| 90 | 194.5232 | 212.5346 | 0.2188 | 0.8449 | 2.0681 |
| 80 | 158.5004 | 176.5118 | 0.2635 | 1.1084 | 2.7131 |
| 70 | 122.4776 | 140.4890 | 0.3311 | 1.4394 | 3.5235 |
| 60 | 86.4548 | 104.4662 | 0.4452 | 1.8847 | 4.6133 |
| 50 | 50.4319 | 68.4434 | 0.6795 | 2.5642 | 6.2767 |
| 40 | 14.4091 | 32.4205 | 1.4346 | 3.9988 | 9.7884 |
| 38 | 7.2046 | 10.8068 | 0.8608 | 4.8596 | 11.8954 |
| 36 | 0.0000 | 3.6023 | 2.5823 | 7.4419 | 18.2163 |

I claim:

1. A submerged pipeline insulated for retaining all or part of the naturally occurring temperature of oil, where the pipeline is submerged in water at least 20° F. lower in temperature than an initial temperature of said oil, comprising,
   a) a pipe;
   b) a first insulation strata including at least three insulation layers formed on a circumference of a pipe portion of said pipeline, said insulation layers having an R value of one of $\geqq 14$ or $\leqq 60$ per inch, as determined by ASTM C-177-85, wherein the compressive strength of said first strata insulation is $\geqq 3500$ psi, as determined by ASTM D-1621, and wherein said insulation layers are present on said inside circumference of sad pipe at a total thickness of one of $\geqq 25$ or $\leqq 60$ mils, said insulation layers including an epoxy, substantially free of phenolics and said insulation layers including one of ceramics, glass and combinations thereof, said layers being one of the same thickness or different thickness, said layers further include a layer or layers of fiber or fabric, said fiber or fabric selected from one of glass, carbon, silica, polyethlene, polypropylene, polyphenylene sulfide, polyphenylene oxide, or combination thereof, said fiber or fabric interspersed between at least two of the insulation layers;
   c) a second insulation strata, said fist insulation strata being spaced between said pipe and said second insulation strata, said second insulation strata including one or more layers of one of urethane foam, syntactic urethane foam, syntactic polyethylene, syntactic polypropylene, or combinations thereof, said second strata having a thickness of one of >1 or <10 inches;
   d) optionally at least one abrasion resistant layer formed on the circumference of said second insulation strata, said abrasion resistant layer, if present, is present at one of $\geqq 10$ or $\leqq 15$ mils, and said abrasion resistant layer including abrasion resistant particles, an epoxy resin, a hardener, and a diluent.

2. An insulated pipe comprising:
   a) optionally at least one abrasion resistant layer;
   b) a first insulation strata including $\geqq 2$ insulation layers including one of acrylics, epoxies, ceramics, glass or combinations thereof;
   c) a second insulation strata including an effective amount of one of syntactic polyurethane, syntactic polyethylene, syntactic polypropylene, polyvinyl chloride, polystyrene, or combinations thereof;
   d) a pipe; and
   wherein said first insulation strata has a compressive strength of $\geqq 100$ psi, as determined by ASTM D-621, and wherein said first insulation strata has an R value of $\geqq 10$ per inch, as determined by ASTM C177-85.

3. The abrasion resistant, corrosion resistant insulated pipe of claim 2 wherein said pipe is part of a pipeline and wherein at least a portion of said pipeline is submerged in water.

4. The abrasion resistant, corrosion resistant insulated pipe of claim 3, wherein said insulation is present in at least four layers, wherein said layers are one of equal or unequal thickness.

5. The abrasion resistant, corrosion resistant insulated pipe of claim 3, wherein said first strata insulation is present in at least three layers, wherein said insulation my be an epoxy, substantially free from phenolics, containing particles, said particles being one of asymmetrical, symmetrical, amorphous, non-spheroidal, spheroidal, or combinations thereof, and wherein said particles are one of ceramic, glass or combinations thereof; wherein said first strata includes at least one layer of a woven or non-woven fabric, said fabric being one of organic or inorganic, and wherein said first strata insulation has a compressive strength of $\geq 200$ psi, as determined by ASTM D-1621, and wherein said insulation has an R value $\geq 14$ per inch, as determined by ASTM C 177-85.

6. The abrasion resistant, corrosion resistant, insulated pipe of claim 3, wherein said optional at least one abrasion resistant layer may be present at one of $\geq 1$ or $\leq 40$ mils, wherein said first strata insulation layers are present at a total of one of $\geq 2$ or $\leq 120$ mils.

7. The abrasion resistant, corrosion resistant insulated pipe of claim 6, wherein said first strata insulation has a compressive strength of $\geq 3000$ psi, as determined by ASTM D-1621, and wherein said first strata insulation has an R value $\geq 50$ per inch, as determined by ASTM C 177-85.

* * * * *